United States Patent Office 3,107,222
Patented Oct. 15, 1963

3,107,222
CORROSION INHIBITION
Olen L. Riggs, Jr., Ponca City, Okla., assignor to Continental Oil Company, Ponca City, Okla., a corporation of Delaware
No Drawing. Filed Nov. 4, 1960, Ser. No. 67,165
14 Claims. (Cl. 252—389)

This invention is directed to corrosion inhibitors and is more specifically concerned with utilization of the reaction product of an unsaturated diol and a polyalkylene polyamine in synergistic conjunction with citric acid or its ammonium or alkali metal salt, to inhibit the corrosion of ferrous metals in contact with aerated brines.

Corrosion presents an extremely serious problem in most chemical process industries and especially when it is accentuated by the presence of dissolved salts and gases. A specific problem of current criticality in the oil industry, which exemplifies the widespread nature of the problem, resides in the drilling of off-shore oil wells. The drilling of such wells requires employment of platforms or other rigs spaced well above the surface of the water and secured to the earth by pilings. The pilings of these offshore platforms are generally enclosed by a metal pipe, referred to as a stand pipe. Sea water occupies the space between the piling and the stand pipe thus subjecting these structures to extreme corrosive attack, which is accelerated by the dissolved oxygen present in such brine.

Other examples specific to the oil industry could be given to illustrate the severity of the problem of corrosion resulting from oxygenated brines; however, the foregoing illustrates the necessity for development of improved corrosion inhibitors.

It is, therefore, a principal purpose of my invention to provide a new combination of materials having superior corrosion inhibition qualities in aqueous systems, and especially in aerated brines. Other objects of my invention will become apparent from consideration of the following description of the various details of my invention.

Co-pending application Serial No. 21,891 discloses the advantageous results which are attainable through incorporation of the reaction product of an unsaturated diol and a polyalkylene polyamine in aqueous systems. This product results from the reaction of from about 0.5 mole equivalent to about 2.0 mole equivalents of polyalkylene polyamine with 1.0 mole equivalent of unsaturated diol. The structural representation of the unsaturated diol and the polyalkylene polyamine are respectively illustrated as:

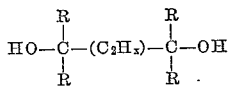

and

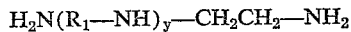

where R is selected from the group consisting of hydrogen, methyl, and ethyl; $R_1$ is selected from the group consisting of ethylene and propylene; $x$ is zero or 2; and $y$ varies from zero through 4 inclusively.

As pointed out in co-pending application Serial No. 21,891, the following compounds are exemplary of the unsaturated diols which may be utilized in preparing the reaction product in question:

2-butynediol-1,4
1-methyl-2-butynediol-1,4
1,4-dimethyl-2-butynediol-1,4
1,1-dimethyl-2-butynediol-1,4
1,1,4-4-tetramethyl-2-butynediol-1,4
1-ethyl-2-butynediol-1,4
1,4-diethyl-2-butynediol-1,4
1,1-diethyl-2-butynediol-1,4
1,1,4,4-tetraethyl-2-butynediol-1,4
1-methyl-1-ethyl-2-butynediol-1,4
1-methyl-4-ethyl-2-butynediol-1,4
1,1-dimethyl-4-ethyl-2-butynediol-1,4
1,1-diethyl-4-methyl-2-butynediol-1,4
1,4-diethyl-1-methyl-2-butynediol-1,4
1,1-dimethyl-4,4-diethyl-2-butynediol-1,4
1,1,4-trimethyl-2-butynediol-1,4
1,1,4-triethyl-2-butynediol-1,4
1,4-dimethyl-1-ethyl-2-butynediol-1,4
1,1,4-trimethyl-4-ethyl-2-butynediol-1,4
1,4-dimethyl-1,4-diethyl-2-butynediol-1,4
1,1,4-triethyl-4-methyl-2-butynediol-1,4

The butenediols corresponding to the above butynediols, as for example, 2-butenediol-1,4; 1,1-dimethyl-2-butenediol-1,4; 1,1,4,4-tetramethyl-2-butenediol-1,4; and 1,4-diethyl-1-methyl-2-butenediol-1,4 to name only a few, are also suitable for preparing the reaction products of this invention.

A few examples of the polyalkylene polyamine which may be used in the preparation of the subject reaction product are ethylene diamine, diethylene triamine, triethylene tetramine, tetraethylene pentamine, pentaethylene hexylamine, dipropylene triamine, and tripropylene tetramine.

As indicated in co-pending application Serial No. 21,891, the desired polyalkylene polyamine-unsaturated diol reaction product involves the dehydration condensation reaction of the amine with the diol in the presence of a chelate-forming metal ion. The necessity for the metal ion was not recognized at the time of filing of co-pending application Serial No. 674,616, filed July 29, 1957, and now abandoned. Although the specific metals used to form the reaction product and the process conditions employed are not a part of this invention, they are described below for the sake of completeness.

The selection of the metal compound is preferably made from ionizable compounds of chelate-forming metals, which are those metals other than the alkali, alkaline earth, and lanthanide metals. In general, the best chelate-formers are cations of small size and high nuclear or ionic charges, such as the metals having atomic numbers of 24–30, 42–48, and 74–80, although I may employ metals selected from a somewhat broader group of metals including those having atomic numbers of 22–30, 41–48, 49–50, and 73–83, inclusive. As indicated above, I prefer to use a copper compound. Although chloride salts may be employed, I prefer to use other ionizable compounds such as metal acetates or other compounds of organic acids. A particularly suitable compound is copper acetate.

The amount of metallic compound depends somewhat upon the particular reactants and metal used; for example, titanium is more active than copper and therefore may be employed in smaller quantities. The amount of metal employed affects the rate of reaction, and since the reaction is exothermic, the desired amount will also depend upon the heat transfer characteristics of the equipment in which the reaction is carried out. It has been established, however, that in the case of copper the amount of metal should preferably not exceed about one-half gram of metal ion per mole of the unsaturated diol. If this limit is exceeded, the reaction proceeds very rapidly and the resulting product generally contains an excess of a high molecular weight resinous fraction and therefore lacks certain desired physical characteristics such as viscosity and water solubility. I have also found that mere trace quantities of copper in the order of 10 parts of copper acetate, per million parts of diol, are effective to promote the desired reaction involving the splitting-off of water to form the condensation product. I generally use from about 10–500, and preferably from about 25–100 parts of copper acetate per million parts of diol.

The unsaturated diol and the polyalkylene polyamine may be simply mixed (preferably in equimolar quantities, but possibly from about ½–2 mole equivalents of amine per mole equivalent of the diol) and the metal compound added thereto. I prefer, however, to dissolve the metal compound in a small quantity of water, and then mix the solution with the diol prior to addition of the amine. The diol is preferably heated slightly to facilitate mixing of the metal compound therewith.

The mixture of diol, amine, and metal compound is then heated slightly to initiate the reaction, in a reaction vessel equipped for the azeotropic removal of water. When the reaction commences, the temperature begins to rise at an accelerated rate, and heating should be discontinued. The water which is formed is trapped and removed and the temperature is allowed to rise slowly until the condensation of water has ceased. After the water of reaction has been removed, the mixture is allowed to cool, an azeotropic solvent such as benzene or toluene is added, and azeotropic distillation conducted to trap out residual water. The solvent is stripped from the mixture after which the then-existing temperature is preferably maintained for about 45 minutes to insure completion of the reaction.

The resulting composition is effective to prevent filiform as well as oxygen corrosion.

The chemical structure of the product has not been elucidated. Depending upon reaction conditions the product is found to contain mixtures of substances of various molecular weights. Gas-liquid phase chromatography studies indicate that more than twelve compounds are formed during the reaction and that individual distillation cuts of the reaction product also contain more than one compound. Infrared analysis showed several groups and various linkages, but poistive identification of the reaction product (or any of its constituents) was not deemed feasible. It is believed that this variety of compounds having a wide range of molecular weights is responsible for the corrosion-inhibiting properties of the product.

The following illustrates the best method of preparing a preferred reaction product.

Into a 500 ml., 3-necked, round bottom flask, place one mole (86 gm.) of 2-butyne-1,4-diol and 0.86 ml. of a stock solution of copper acetate. (This stock solution consists of 5 gm. of $Cu(C_2H_3O_2)_2H_2O$ dissolved in 1,000 ml. of de-ionized water heated to 50° C.) The temperature is raised to the melting point of the diol (57–58° C.), while stirring, to mix in the copper. To the warm solution add one mole of tetraethylene pentamine (189 grams) while continuing to stir the mixture. Raise the temperature to 180° C. and hold. Water begins to distill over at approximately 170° C. Continue distillation until 18–20 ml. of distillate has been trapped. Cool ingredients to 70° C. and add 30 ml. toluene for azeotrope of remaining water. Raise the temperature. Azeotropic distillation begins at approximately 134° C. Trap and remove water only as thimble fills. The temperature will slowly rise with removal of residual water. As the temperature reaches 190° C., measure the water (it should be near 16 ml. volume). Continue to let the temperature rise as toluene is stripped free of the reaction product. The temperature should not be allowed to exceed about 225° C. A few ml. of a yellow distillate will be trapped out in the toluene at temperatures between 190° C.–225° C. The product forms a bright, clear solution in water.

Another preferred product is formed in the same manner using pentaethylene hexylamine in place of tetraethylene pentamine.

As indicated above, other ionizable metal compounds may be used in place of copper acetate, such as cupric chloride, cobaltous chloride, manganous chloride, stannous chloride, and many other compounds of the classes outlined above and in co-pending application Serial No. 21,891.

Any of the above-specified unsaturated diols and polyalkylene polyamines may be used in place of 2-butyne-1,4-diol and tetraethylene pentamine to form the reaction product.

The specific improvement of the present invention resides in the discovery that the utilization of the foregoing reaction product in combination with citric acid or its ammonium or alkali metal salt results in synergistic improvement in the corrosion inhibition characteristics of the reaction product.

This conclusion is well substantiated by ample test data obtained through comparison of the extensiveness of corrosion upon a mild steel test coupon immersed in 250 cc. of an aerated 5 percent sodium chloride solution treated with the inhibitor of this invention as well as with the other inhibitors and chemicals specified.

The indicated quantities of the comparative materials were dissolved in the brine solution and the test coupon totally immersed and permitted to stand for a period of seven days. Upon completion of exposure each coupon was scrubbed clean using an abrasive household cleanser, a soft brush, and water. The coupons were rinsed in acetone, dried, and weighed and the percent protection was calculated on the basis of the weight loss of the coupon exposed to the treated brine as compared with the weight loss of a control coupon immersed in 250 cc. of an untreated aerated 5 percent sodium chloride solution. Comparative test results are indicated in the following table:

*Corrosion Inhibitor Effectiveness in Aerated Brine*

| Compounds and aqueous concentrations used | Percent protection | Surface corrosion |
| --- | --- | --- |
| 0.1% ammonium citrate plus 100 p.p.m. of the reaction product of butenediol and diethylene triamine. | 99 | None noted. |
| 0.1% citric acid plus 100 p.p.m. of the reaction product of butenediol and diethylene triamine. | 93.2 | Do. |
| 0.1% CaO plus 100 p.p.m. imidazoline maleate plus 10% isopropanol. | 91.6 | Very small concentration cell areas. |
| 0.1% CaO plus 100 p.p.m. of a mixture of imidazoline sulfonates and maleates plus 10% isopropanol. | 88.5 | Concentration cell areas. |
| 0.1% CaO plus 100 p.p.m. of a mixture of imidazoline sulfonates and maleates plus 10% isopropanol. | 72.6 | Do. |
| 0.1% CaO plus 100 p.p.m. of imidazoline acetate. | 70.7 | Overall pitting. |
| 0.1% CaO plus 0.1% $K_2Cr_2O_7$ | 66.9 | Large concentration cell areas. |
| 100 p.p.m. of the reaction product of butenediol and diethylene triamine. | 64.3 | General. |
| 0.1% CaO. | 63.1 | Large concentration cell areas. |
| 0.1% ZnO plus 0.1% CaO. | 62.3 | Do. |
| 0.1% ammonium citrate plus 0.1% CaO. | 59.4 | Small pits overall. |

| Compounds and aqueous concentrations used | Percent protection | Surface corrosion |
|---|---|---|
| 0.1% sodium borate plus 10% isopropanol plus 100 p.p.m. of imidazoline maleate. | 58.5 | General. |
| 0.1% CaO plus 0.1% Na₂SO₃ | 57.2 | Large concentration cell areas. |
| 100 p.p.m. of imidazoline maleate plus 10% isopropanol. | 54.7 | General. |
| 0.1% Zn(CH₃COO)₂ and 0.1% CaO | 53.5 | Do. |
| 0.1% K₂Cr₂O₇ | 49.7 | Large concentration cell areas. |
| 100 p.p.m. imidazoline salicylate | 49 | General. |
| 0.1% NaNO₂ 100 p.p.m. imidazoline maleate plus 10% isopropanol | 47.1 | Scalding pits. |
| 0.1% Zn(CH₃COO)₂ | 46.5 | General. |
| 0.1% CaO and 100 p.p.m. of a trimethyl ammonium chloride of tallow. | 42.8 | General and local pits. |
| 0.1% NaNO₂ | 40.8 | Pitting. |
| 100 p.p.m. imidazoline polydodecylbenzene sulfonate and 1% of a dispersion of polyoxyethylene sorbitan mono-oleate. | 17 | General. |
| 0.1% Na₂SO₃ | 16.9 | Do. |
| 0.1% ZnO | 16.1 | Do. |
| 0.1% sodium borate | 15.5 | Do. |
| 100 p.p.m. of a rosin amine with 10 moles of ethylene oxide. | 15 | Do. |
| 100 p.p.m. of a trimethyl ammonium chloride of tallow. | 7.5 | Do. |
| 100 p.p.m. of a rosin amine | 6 | Do. |
| 100 p.p.m. of an experimental rosin amine having more than 10 moles of ethylene oxide. | 5 | Do. |
| 0.1% ammonium citrate | −4.1 | Do. |
| 0.1% CaO and 0.1% citric acid | −14.5 | Do. |
| 100 p.p.m. diethylene triamine | −52.3 | Do. |
| 0.1% citric acid | −53.1 | Etched overall. |
| 0.1% ammonium acetate | −110.3 | Do. |

It will be observed that notwithstanding the fact that citric acid very substantially accelerated corrosion of the test coupon, as did ammonium citrate, the utilization of these compounds in conjunction wtih the reaction product of the polyalkylene polyamine and the unsaturated diol unexpectedly resulted in a substantial increase in the corrosion inhibition effectiveness of the reaction product. Thus, the employment of the corrosion inhibitor of my invention renders an aerated brine clearly less corrosive than such a brine treated solely with the subject reaction product. It is illustratively superior to other inhibitors and combinations of inhibitors presently known to the art.

Although the above results were obtained with a 100 p.p.m. concentration of reaction product and a one-tenth percent or 1000 p.p.m. concentration of citric acid or its ammonium or alkali metal salts, it must be realized that far lower concentrations of these materials are effective to inhibit corrosion. The high concentrations of citric acid and ammonium citrate were employed in the above-described tests to establish more firmly the effectiveness of the polyalkylene polyamine reaction product when used in conjunction with concentrations of citric acid and ammonium citric which cause acelerated corrosion when used by themselves. The optimum concentration of a corrosion inhibitor required to give the desired results is dependent upon the specific nature of the aqueous fluid and upon the concentration of oxygen in solution. Where the salt concentration of the brine and its oxygen content are relatively low, much lower concentration of our corrosion inhibitor may be utilized effectively. Similarly, where salt concentration and oxygen content are high, the concentration of our corrosion inhibitor may be increased to the extent necessary to give commercially effective protection. Generally, however, the acid or its salts should be used in concentrations within the range of from 0.2 p.p.m. to 50 p.p.m. (preferably 10–25 p.p.m.) and the diol-polyamine reaction product within the range of from 2 p.p.m. to 500 p.p.m. (preferably 100–250 p.p.m.). For example, in one test (carried out with an aerated brine in the manner indicated above), 10 p.p.m. of ammonium citrate was used in conjunction with 250 p.p.m. of the product of reacting 2-butyne-1,4-diol with tetraethylene pentamine, to give 95 percent protection. It should nevertheless be recognized that these concentrations are not, and cannot be, absolute limitations in view of the innumerable variations which are possible in the concentration of salts and oxygen in aqueous fluids and in the nature of the salts and gases other than oxygen occurring in such fluids. The specific concentration to be used will, in any event, be readily apparent from the nature and corrosiveness of the aqueous solution to be inhibited.

Having fully described my invention, I claim:

1. A process for preventing corrosion of ferrous metals in contact with an aqueous fluid which comprises incorporating in said aqueous fluid (a) about 2 to 500 parts per million of a product formed by the dehydration-condensation reaction of $$HO-\underset{R}{\overset{R}{\underset{|}{C}}}-X-\underset{R}{\overset{R}{\underset{|}{C}}}-OH$$

and $$H_2N(R_1-NH)_y-CH_2CH_2-NH_2$$

wherein R is selected from the group consisting of hydrogen, methyl, and ethyl, x is selected from the group consisting of —C≡C— and —CH=CH—

R₁ is selected from the group consisting of ethylene and propylene, and y varies from zero through 4 inclusively, said dehydration-condensation reaction being conducted in the presence of a small amount of a chelate-forming metal ion; and (b) about 0.2 to 50 parts per million of a compound selected from the group consisting of citric acid and its ammonium and alkali metal salts.

2. The process of claim 1 wherein the aqueous fluid is an oxygen-containing brine.

3. The process of claim 2 in which the hydroxy compound is citric acid.

4. The process of claim 2 in which the low molecular weight hydroxy compound is ammonium citrate.

5. The process of claim 1 wherein the aqueous fluid is an oxygen-containing brine, and the reaction product is the reaction product of 2-butyne-1,4-diol and tetraethylene pentamine, formed in the presence of a small amount of an ionizable copper compound.

6. The process of claim 5 wherein the hydroxy compound is citric acid.

7. The process of claim 5 wherein the hydroxy compound is ammonium citrate.

8. The process of claim 1 wherein the aqueous fluid is an oxygen-containing brine, and the reaction product is the reaction product of 2-butyne-1,4-diol and pentaethylene hexylamine, formed in the presence of a small amount of an ionizable copper compound.

9. The process of claim 8 wherein the hydroxy compound is citric acid.

10. The process of claim 8 wherein the hydroxy compound is ammonium citrate.

11. A process for preventing the corrosion of a ferrous metal in contact with an aqueous brine, which comprises incorporating into said fluid (a) about 10–25 parts per million of citric acid and (b) about 100–250 parts per million of the dehydration-condensation reaction product of 2-butyne-1,4-diol and tetraethylene pentamine, formed in the presence of a small amount of copper acetate.

12. A process for preventing the corrosion of a ferrous metal in contact with an aqueous brine, which comprises incorporating into said fluid (a) about 10–25 parts per million of citric acid and (b) about 100–250 parts per million of the dehydration-condensation reaction product of 2-butyne-1,4-diol and pentaethylene hexylamine, formed in the presence of a small amount of copper acetate.

13. A process for preventing the corrosion of a ferrous metal in contact with an aqueous brine, which comprises incorporating into said fluid (a) about 10-25 parts per million of ammonium citrate and (b) about 100-250 parts per million of the dehydration-condensation reaction product of 2-butyne-1,4-diol and tetraethylene pentamine, formed in the presence of a small amount of copper acetate.

14. A process for preventing the corrosion of a ferrous metal in contact with an aqueous brine, which comprises incorporating into said fluid (a) about 10-25 parts per million of ammonium citrate and (b) about 100-250 parts per million of the dehydration-condensation reaction product of 2-butyne-1,4-diol and pentaethylene hexylamine, formed in the presence of a small amount of copper acetate.

References Cited in the file of this patent

UNITED STATES PATENTS 2,383,800     Johnson _____ Aug. 28, 1945

FOREIGN PATENTS 1,024,773     Germany _____ Feb. 20, 1958

OTHER REFERENCES

Foster et al.: Acetylenic Corrosion Inhibitors, article in Ind. and Eng. Chem., July 1959, pp. 825 to 828.